United States Patent [19]
Stuedemann et al.

[11] Patent Number: 5,953,961
[45] Date of Patent: Sep. 21, 1999

[54] CONNECTION BETWEEN STEERING COLUMN AND MOTOR VEHICLE BODY

[75] Inventors: Richard Thomas Stuedemann, Hemlock; Richard Kremer Riefe, Saginaw; Ray Garnet Armstrong, Bay City, all of Mich.

[73] Assignee: General Motors Corporation, Detroit, Mich.

[21] Appl. No.: 09/053,360

[22] Filed: Apr. 1, 1998

[51] Int. Cl.$^6$ .............................. B62D 1/19; F16B 37/04
[52] U.S. Cl. ........................... 74/492; 188/371; 280/777; 280/779; 411/182
[58] Field of Search .............................. 74/492; 280/777, 280/779, 780; 188/371, 376; 411/182

[56] References Cited

U.S. PATENT DOCUMENTS

| | | | |
|---|---|---|---|
| 1,611,302 | 12/1926 | Bourgon | 280/779 |
| 3,329,040 | 7/1967 | Stein | 74/492 X |
| 3,392,599 | 7/1968 | White | 74/492 |
| 3,394,613 | 7/1968 | Curtindale | 74/492 |
| 3,476,345 | 11/1969 | Ristau | 248/221 |
| 3,747,427 | 7/1973 | Milton et al. | 74/492 |
| 3,795,038 | 3/1974 | Brezinski et al. | 29/417 |
| 3,868,864 | 3/1975 | Durkee et al. | 74/492 |
| 4,000,876 | 1/1977 | Usui et al. | 74/492 X |
| 5,026,092 | 6/1991 | Abramczyk | 280/777 |

*Primary Examiner*—Allan D. Herrmann
*Attorney, Agent, or Firm*—Edmund P. Anderson

[57] ABSTRACT

A connection between a collapsible mast jacket of an energy absorbing steering column and a body of a motor vehicle including a mounting bracket on the mast jacket having an attachment flange perpendicular to a longitudinal centerline of the steering column, an aperture in the attachment flange, a plastic bushing captured in the aperture, and a fastener operative to rigidly clamp the plastic bushing to the body of the motor vehicle. The plastic bushing fractures in response to an impact on the steering column to release the mounting bracket. In a preferred embodiment, retention between the attachment flange and the plastic bushing is effected by an edge of the aperture in the attachment flange seated in an annular outside groove in the plastic bushing. A plurality of linear slots in the plastic bushing divide the plastic bushing into a plurality of cantilever spring segments which flex inward when the bushing is pushed into the aperture in the attachment flange and which snap out when the annular slot in the bushing registers with the peripheral edge of the aperture in the attachment flange.

5 Claims, 2 Drawing Sheets

5,953,961

CONNECTION BETWEEN STEERING COLUMN AND MOTOR VEHICLE BODY

TECHNICAL FIELD

This invention relates to a connection between an energy absorbing steering column and a body of a motor vehicle.

BACKGROUND OF THE INVENTION

U.S. Pat. No. 3,392,599, issued Jul. 16, 1968 and assigned to the assignee of this invention, describes an energy absorbing steering column for a motor vehicle including a tubular mast jacket which collapses longitudinally through an energy absorbing stroke in response to an impact on the steering column. An upper or outboard connection between the mast jacket and a body of the motor vehicle includes a mounting bracket on the mast jacket having a pair of lateral flanges, a pair of open slots in the lateral flanges, a pair of capsules slidably mounted in the slots and rigidly clamped to the vehicle body, and a plurality of injection molded plastic pins which couple the capsules to the lateral flanges of the mounting bracket. Force attributable to the impact on the steering column is initially reacted to the vehicle body through the plastic pins which fracture when such impact force attains a magnitude determined by the physical characteristics of the plastic pins, e.g. dimensions and material strength. When the plastic pins fracture, the capsules are uncoupled from the lateral flanges of the mounting bracket and the latter is released from the vehicle body for linear translation as a unit with the mast jacket. U.S. Pat. Nos. 3,795,038 and 3,868,864, issued Mar. 5, 1974 and Mar. 4, 1975 and assigned to the assignee of this invention, describe energy absorbing steering columns having similar connections in which the capsules are releasably retained on the outboard mounting bracket by, respectively, tangs on the bracket bent behind the capsules and by tangs on the capsules bent into notches in the bracket. U.S. Pat. No. 3,747,427, issued Jul. 24, 1973 and assigned to the assignee of this invention, describes an energy absorbing steering column having a similar connection in which the capsules are releasably retained on the mounting bracket by friction between the bracket and the capsules. The connection according to this invention between a mast jacket of an energy absorbing steering column and a body of a motor vehicle is a novel alternative to the connections described in the aforesaid United States patents.

SUMMARY OF THE INVENTION

This invention is a new and improved connection between a longitudinally collapsible mast jacket of an energy absorbing steering column and a body of a motor vehicle including a mounting bracket on the mast jacket having an attachment flange perpendicular to a longitudinal centerline of the steering column, an aperture in the attachment flange, a plastic bushing captured in the aperture, and a fastener operative to rigidly clamp the plastic bushing to the body of the motor vehicle. The plastic bushing fractures in response to an impact on the steering column to release the mounting bracket from the vehicle body for linear collapse as a unit with the mast jacket of the steering column. In a preferred embodiment, retention between the attachment flange and the plastic bushing is effected by an edge of the aperture in the attachment flange seated in an annular outside groove in the plastic bushing. A plurality of linear slots in the plastic bushing divide the plastic bushing into a plurality of cantilever spring segments which flex inward when the bushing is pushed into the aperture in the attachment flange and which snap out when the annular slot in the bushing registers with the peripheral edge of the aperture in the attachment flange.

DESCRIPTION OF THE PREFERRED EMBODIMENT

Figure 1:
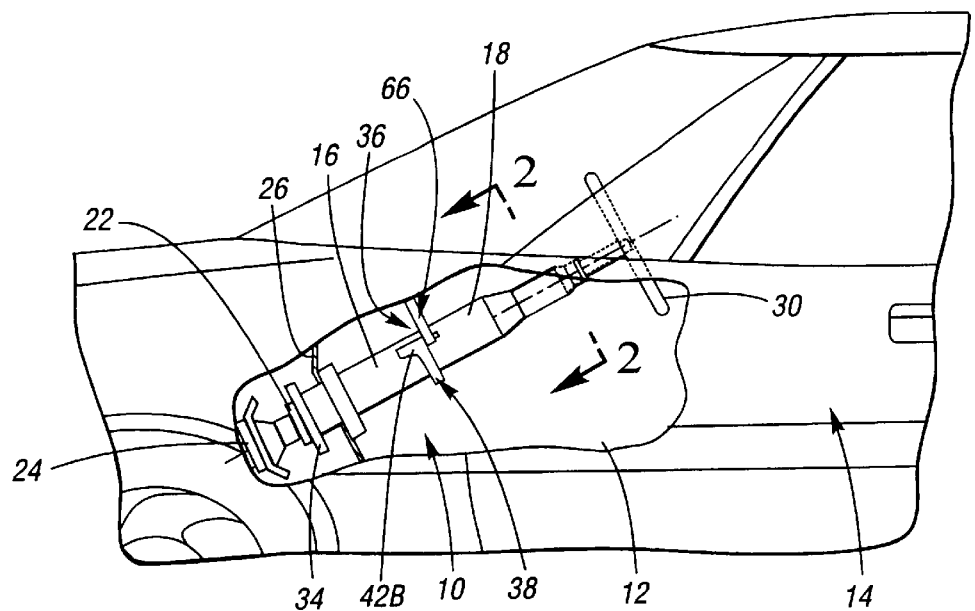
FIG. 1 is a fragmentary, partially broken-away view of a motor vehicle having an energy absorbing steering column attached to a body of the motor vehicle through a connection according to this invention.
Figure 2:
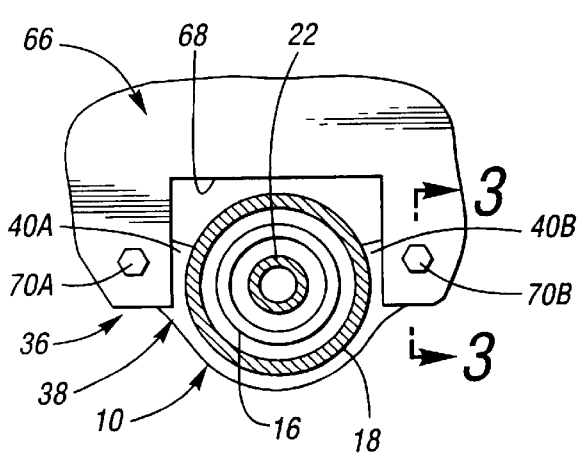
FIG. 2 is an enlarged sectional view taken generally along the plane indicated by lines 2—2 in FIG. 1.

Referring to FIG. 1, an energy absorbing steering column 10 is disposed in a passenger compartment 12 of a motor vehicle body 14. The steering column 10 may have the construction described in the aforesaid U.S. Pat. No. 3,392,599, the disclosure of which is incorporated herein by reference, and includes, generally, a tubular lower mast jacket 16, a tubular upper mast jacket 18 telescopically overlapping the lower mast jacket, and an energy absorber, not shown, in the overlap between the upper and the lower mast jackets. The energy absorber resists linear translation of the upper mast jacket relative to the lower mast jacket in the direction of a longitudinal centerline 20 of the steering column.

Figure 5:
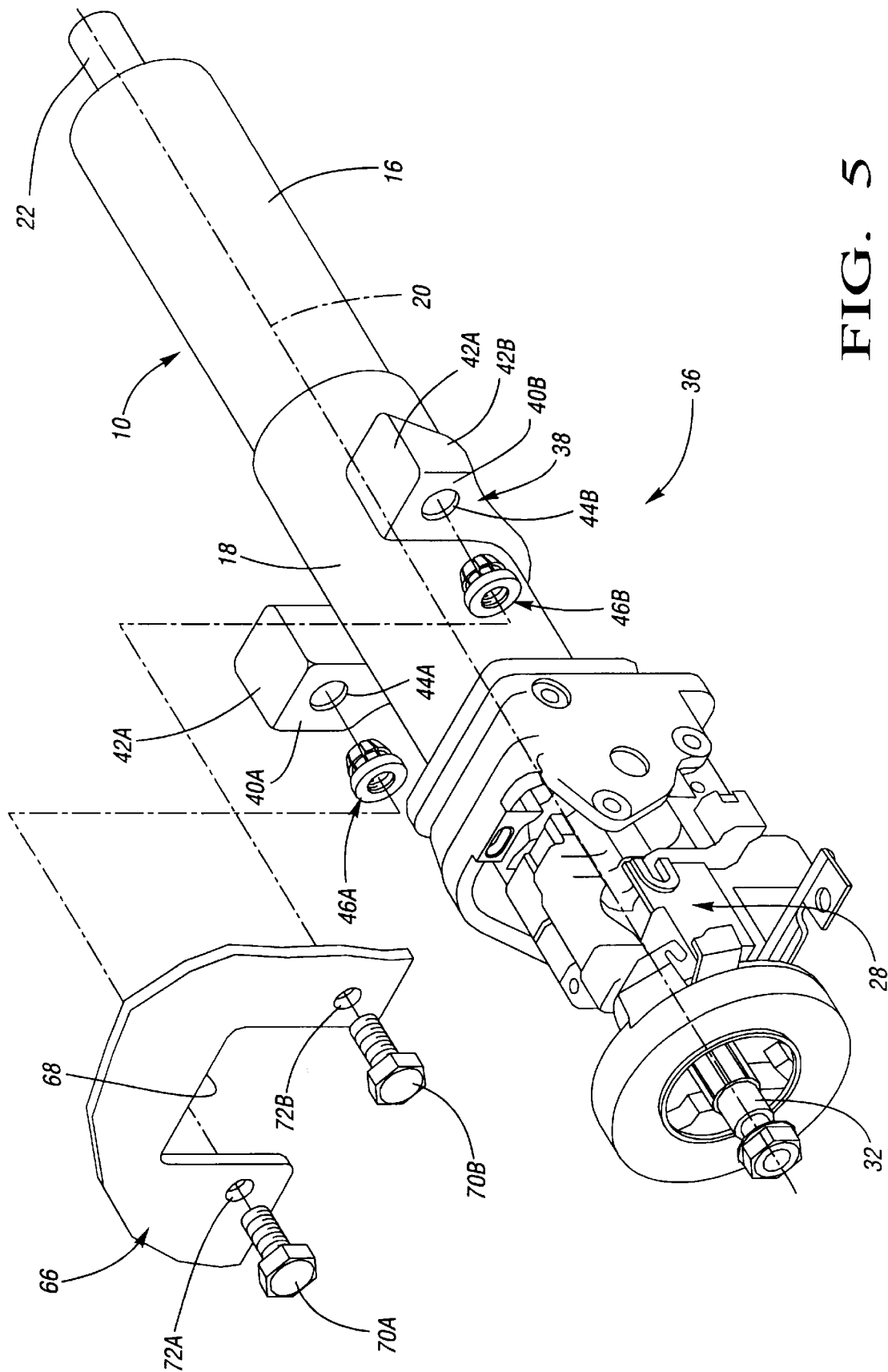
FIG. 5 is an exploded perspective view the connection according to this invention.

A steering shaft 22 is supported on the upper and the lower mast jackets for rotation about the longitudinal centerline 20 of the steering column. The steering shaft is connected to a steering gear 24 of the motor vehicle ahead of a vertical panel 26 of the vehicle body. A tilt housing 28, FIG. 5, is supported on the upper mast jacket 18 for up and down pivotal movement. A steering hand wheel 30 is rotatably supported on the tilt housing by an upper steering shaft 32, FIG. 5, and is connected to the steering shaft 22 by a universal coupling, not shown, between the upper steering shaft 32 and the steering shaft 22. Up and down pivotal movement of the tilt housing adjusts the vertical position of the steering hand wheel 30.

The lower mast jacket 16 is rigidly connected to the body 14 of the motor vehicle through a schematically represented lower bracket assembly 34 attached to the vertical panel 26. Force attributable to an impact on the steering hand wheel 30 is transferred from the upper mast jacket 18 to the lower mast jacket 16 through the aforesaid energy absorber and reacted to the vehicle body through the lower bracket assembly 34. The upper mast jacket 18 is releasably attached to the vehicle body 14 through a connection 36 according to this invention.

As seen best in FIG. 5, a U-shaped mounting bracket 38 of the connection 36 is rigidly attached to the upper mast jacket 18 and includes a pair of attachment flanges 40A,40B on opposite sides of the mast jacket in a plane perpendicular to the longitudinal centerline 20 of the steering column. The attachment flanges 40A,40B are each reinforced by a pair of integral horizontal and vertical gussets 42A,42B, respectively. The attachment flanges 40A,40B are perforated by respective ones of a pair of equal-diameter circular apertures 44A,44B.

Figure 3:
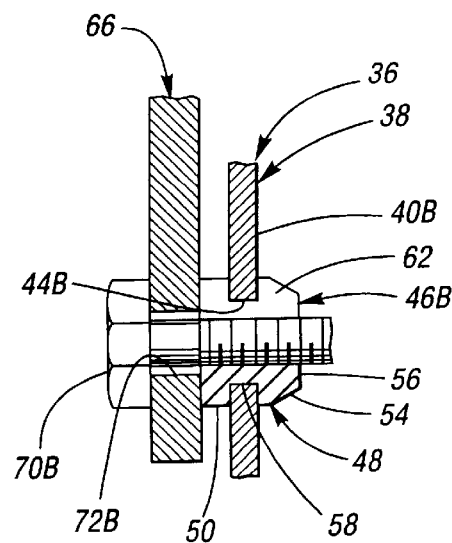
FIG. 3 is an enlarged sectional view taken generally along the plane indicated by lines 3—3 in FIG. 2.
Figure 4:
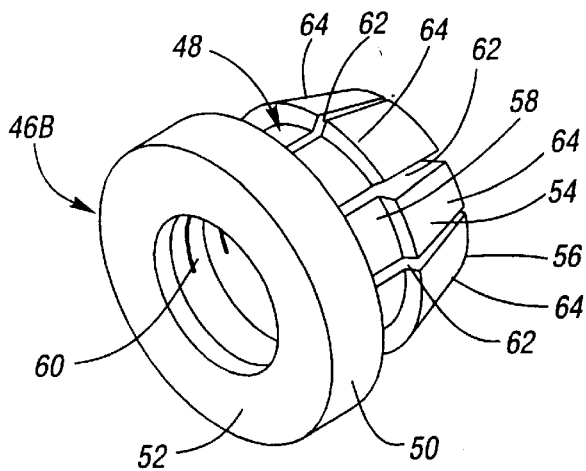
FIG. 4 is a perspective view of a plastic bushing of the connection according to this invention.

As seen best in FIGS. 3–5, the connection 36 further includes a pair of identical plastic bushings 46A,46B. Further describing only the plastic bushing 46B, FIG. 4, the latter has a tubular body 48 with an annular lip 50 at a first end 52 and a frustoconical shoulder 54 at a second end 56. Between the lip 50 and the frustoconical shoulder 54, the tubular body is interrupted by an annular outside groove 58 having a diameter corresponding generally to the diameters of the circular apertures 44A,44B in the mounting flanges 40A,40B. An inside screw thread 60 on the tubular body 48, FIG. 4, extends between the first and the second ends 52,56 thereof. A plurality of slots 62 in the tubular body 48 are open through the second end 56 thereof and traverse the annular groove 58 and the frustoconical shoulder 54. The slots 62 cooperate in dividing the tubular body 48 into a plurality of cantilever spring segments 64 each of which has a portion of the frustoconical shoulder 54 thereon.

The plastic bushings 46A,46B are mounted on the attachment flanges 40A,40B by pushing the distal second ends 56 of the tubular bodies 48 into the circular apertures 44A,44B. The frustoconical shoulders 54 on the tubular bodies of the plastic bushings engage the edges of the circular apertures 44A,44B and convert linear thrust into radial thrust to flex the cantilever spring segments 64 inward and thereby accommodate linear translation of the tubular bodies 48 into the circular apertures. When the annular grooves 58 in the tubular bodies achieve registry with the edges of the circular apertures 44A,44B, the cantilever spring segments snap out. In that circumstance, the edges of the circular apertures 44A,44B are disposed between the sides of the annular grooves 58 which sides interfere with the attachment flanges to prevent dislodgment of the plastic bushings from the circular apertures. The annular groove 58 on each tubular body 48 is separated from the corresponding annular lip 50 by a span calculated to seat the lip against the corresponding one of the attachment flanges 40A,40B when the cantilever spring segments snap out to capture the edges of the circular apertures 44A,44B.

As seen best in FIGS. 1–3 and 5, the steering column 10 traverses the plane of a structural panel 66 of the vehicle body 14 through an arch 68 in the structural panel. The structural panel 66 is separated from the vertical panel 26 of the vehicle body by a span calculated to juxtapose the attachment flanges 40A,40B and the structural panel 66 with the annular lips 50 on the plastic bushings 46A,46B therebetween, FIG. 3. Respective ones of a pair of fasteners 70A,70B protrude through corresponding ones of a pair of apertures 72A,72B in the structural panel 66 and cooperate with the inside screw threads 60 on the plastic bushings to rigidly clamp each of the plastic bushings to the structural panel 66. With the plastic bushings thus rigidly clamped to the structural panel 66, the upper end of the steering column 10 is rigidly connected to the body 14 of the motor vehicle through the mounting bracket 38.

An impact on the steering hand wheel 30 toward the vertical panel 26 of the vehicle body induces a force on the upper mast jacket 18 which is initially reacted to the vehicle body through the attachment flanges 40A,40B on the mounting bracket 38, the plastic bushings 46A,46B, the fasteners 70A,70B, and the structural panel 66. When such impact force attains a magnitude exceeding the structural integrity of the plastic from which the plastic bushings are fabricated, the plastic bushings fracture to release the attachment flanges 40A,40B on the mounting bracket 38 from the bushings. With the mounting bracket thus released, the upper mast jacket 18 is released from the structural panel 66 for linear translation relative to the lower mast jacket 16 in the direction of the longitudinal centerline 20 of the steering column through a collapse stroke against the controlled resistance of the aforesaid energy absorber between the upper and the lower mast jackets.

Having thus described the invention, what is claimed is:

1. A connection between a body of a motor vehicle and a mast jacket of an energy absorbing steering column collapsible in the direction of a longitudinal centerline of said steering column through an energy absorbing stroke in response to an impact on said steering column comprising:

an attachment flange rigidly connected to said mast jacket in a plane perpendicular to said longitudinal centerline of said steering column, an aperture in said attachment flange, a plastic bushing in said aperture in said attachment flange, a retention means operative to capture said plastic bushing in said aperture in said attachment flange, and a clamp means operative to rigidly clamp said plastic bushing to said body of said motor vehicle, said plastic bushing fracturing in response to said impact on said steering column thereby to release said attachment flange from said body of said motor vehicle for collapse as a unit with said mast jacket in the direction of said longitudinal centerline of said steering column.

2. The connection between a body of a motor vehicle and a mast jacket of an energy absorbing steering column recited in claim 1 wherein said retention means operative to capture said plastic bushing in said aperture in said attachment flange comprises:

a tubular body on said plastic bushing traversing said attachment flange through said aperture therein, and an outside groove on said tubular body in the plane of said attachment flange having a pair of opposite sides interfering with said attachment flange to prevent dislodgment of said tubular body from said aperture in said attachment flange.

3. The connection between a body of a motor vehicle and a mast jacket of an energy absorbing steering column recited in claim 2 further comprising:

a frustoconical shoulder on said tubular body at a distal end thereof, and a plurality of slots in said tubular body of said plastic bushing open through said distal end thereon and traversing said annular groove and said frustoconical shoulder and cooperating in defining a plurality of cantilever spring segments on said tubular body, said frustoconical shoulder cooperating with an edge of said aperture in said attachment flange when said distal end of said tubular body is pushed into said aperture to convert linear thrust into radial thrust on each of said cantilever spring segments and flex each of said cantilever spring segments inward to accommodate linear translation of said tubular body into said aperture until said outside groove registers with said aperture in said attachment flange.

4. The connection between a body of a motor vehicle and a mast jacket of an energy absorbing steering column recited in claim 3 wherein:

said aperture in said attachment flange is a circular aperture, and said outside groove in said tubular body of said plastic bushing is an annular outside groove having a diameter substantially equal to the diameter of said circular aperture.

5. The connection between a body of a motor vehicle and a mast jacket of an energy absorbing steering column recited in claim 4 wherein said clamp means operative to rigidly clamp said plastic bushing to said body of said motor vehicle comprises:

an inside screw thread on said tubular body of said plastic bushing, a flat structural panel on said body of said motor vehicle juxtaposed said attachment flange, an aperture in said flat structural panel aligned with said circular aperture in said attachment flange, and a fastener protruding through said aperture in said flat structural panel and screwed into said inside screw thread on said tubular body of said plastic bushing.

\* \* \* \* \*